United States Patent
Schröder et al.

(10) Patent No.: US 7,198,319 B2
(45) Date of Patent: Apr. 3, 2007

(54) DOOR MODULE FOR VEHICLE DOOR

(75) Inventors: Helmut Schröder, Grefrath (DE); Alexander Schidan, Solingen (DE); Hans-Helmut Mieglitz, Monheim (DE); Harald John, Dusseldorf (DE); Derek Jones, Buchholz (DE)

(73) Assignee: Johnson Controls Technology Company, Holland, MI (US)

( * ) Notice: Subject to any disclaimer, the term of this patent is extended or adjusted under 35 U.S.C. 154(b) by 64 days.

(21) Appl. No.: 10/537,629

(22) PCT Filed: May 6, 2004

(86) PCT No.: PCT/EP2004/004804

§ 371 (c)(1),
(2), (4) Date: Jun. 3, 2005

(87) PCT Pub. No.: WO2004/108481

PCT Pub. Date: Dec. 16, 2004

(65) Prior Publication Data

US 2006/0043764 A1    Mar. 2, 2006

(30) Foreign Application Priority Data

Jun. 6, 2003   (DE)   ............... 103 26 154

(51) Int. Cl.
*B60J 5/00*   (2006.01)
(52) U.S. Cl. .................. 296/146.7; 49/502
(58) Field of Classification Search ........... 296/146.7, 296/39.1; 49/502
See application file for complete search history.

(56) References Cited

U.S. PATENT DOCUMENTS 5,111,620 A * 5/1992 Lau et al. .............. 49/502

(Continued)

FOREIGN PATENT DOCUMENTS

DE   35 100 18 A1   1/1986

(Continued)

OTHER PUBLICATIONS

International Search Report for PCT/EP2004/004804, mailed Mar. 9, 2004, 3 pages.

*Primary Examiner*—Kiran B. Patel
(74) *Attorney, Agent, or Firm*—Foley & Lardner LLP (57) ABSTRACT

The invention relates to a door module (2) for a vehicle door, which is divided in a sealed manner into an outer wet chamber (44) that faces the door shell (1) and an inner dry chamber (43). Said door module is equipped with pre-assembled mechanical and/or electrical functional components that are fixed in the dry chamber and can be mechanically and/or electrically connected to door components that are located in the wet chamber. The seal between the dry chamber and the wet chamber is formed by a separation sheet (12), which is penetrated by sealed connecting elements of the functional components that are held on the dry side of said separation sheet in the door module. According to the invention, the decorative inner covering (3) of the door module (2) and/or a reinforcement element (20) that is mounted on said covering in the door module comprise contact pressure zones, which preferably extend over the whole periphery and onto which the separation sheet can be pressed in a sealing manner, by contact with the door shell.

13 Claims, 10 Drawing Sheets

U.S. PATENT DOCUMENTS

| | | | |
|---|---|---|---|
| 5,603,548 A * | 2/1997 | Gandhi et al. | 296/146.7 |
| 6,412,852 B1 * | 7/2002 | Koa et al. | 296/146.7 |
| 6,422,640 B2 * | 7/2002 | Whitehead et al. | 296/146.7 |
| 6,615,546 B2 * | 9/2003 | Furuyama et al. | 49/502 |
| 6,676,324 B1 * | 1/2004 | Pleiss | 296/146.7 |
| 6,725,606 B2 * | 4/2004 | Nishikawa et al. | 49/502 |
| 6,767,049 B1 * | 7/2004 | Morrison et al. | 296/146.7 |
| 6,890,018 B1 * | 5/2005 | Koa et al. | 296/146.5 |
| 7,055,887 B2 * | 6/2006 | Williams, II et al. | 296/146.7 |
| 7,059,659 B2 * | 6/2006 | Smith et al. | 296/146.7 |
| 7,066,527 B2 * | 6/2006 | Kohara et al. | 296/146.7 |
| 2002/0027376 A1 | 3/2002 | Marcovecchio et al. | |
| 2006/0170242 A1 * | 8/2006 | Forrester et al. | 296/146.7 |

FOREIGN PATENT DOCUMENTS

| | | |
|---|---|---|
| DE | 197 12 266 A1 | 10/1998 |
| DE | 100 40 954 A1 | 3/2002 |
| DE | 101 35 848 A1 | 2/2003 |
| WO | WO 97/045283 A1 | 12/1997 |
| WO | WO 03/031211 A1 | 4/2003 |
| WO | WO 03/031233 A1 | 4/2003 |

* cited by examiner

DOOR MODULE FOR VEHICLE DOOR

FIELD OF THE INVENTION

The invention relates to a door module for a vehicle door, which is divided in a sealed manner into an outer wet door chamber, facing the door shell, and an inner dry door chamber, with mechanical and/or electrical functional components that are secured in a preassembled manner on the door module in the dry door chamber and can be mechanically and/or electrically connected to door components arranged in the wet door chamber, the seal between the dry door chamber and the wet door chamber being formed by a separating sheet which is penetrated in a sealed manner by the connecting means of the functional components secured on the door module on the near side of the separating sheet.

BACKGROUND

A first door module for a vehicle door is known from the publication DE 101 44 330 A1. The vehicle door disclosed there comprises a door shell and a door module, which for its part has a module support and a decorative trim fastened to the latter on the interior side. The module support is connected to the door shell in a sealed manner in such a way that the vehicle door is divided into an outer wet door chamber, located on the far side of the module support, and an inner dry door chamber, arranged on the near side of the module support.

Mechanical and electrical functional components, for example a door control device, are held on the sturdy module support and can be fitted into corresponding counterparts of the door components, for example of an electrical window lifter, in the wet door chamber during the assembly of the door module by using connecting means that are likewise arranged on the module support. This special design of the connecting means and the assigned counterparts means that the electrical or mechanical connection takes place by simply joining the door module with the door shell in the Y direction of a customary system of X, Y, Z coordinates of a motor vehicle, that is to say by a horizontal movement transversely to the traveling direction. After the joining of the door module, generally no further measures are required for the coupling of functional and door components. In individual cases, the connection is created by the first-time actuation of the functional components.

A prefabricated door module of such a design considerably simplifies and shortens the assembly at the vehicle manufacturer's and meets the set requirements. Since, however, the module support serves not only for receiving (heavy) functional elements in the dry door chamber but also for forming a seal between the dry door chamber and the wet door chamber, it is on the one hand to be designed with a correspondingly thick wall for absorbing the mechanical forces. On the other hand, it must completely cover the wet door chamber, in order to ensure the required sealing effect, and consequently has a considerable surface area extent. The door module is therefore comparatively heavy. Furthermore, such rigid plate-shaped components are generally less satisfactory in their acoustic properties.

A further door module is described in German Utility Model DE 296 07 664 U1. In the case of this vehicle door too, an assembly support of a rigid design serves in the same way for separating the wet door chamber and the dry door chamber and for securing functional elements which are arranged in trough-like depressions of the assembly support. In the case of this configuration, however, the electrical drive of a window lifter is arranged in the dry door chamber, so that only the mechanical scissors-type mechanism of the window lifter that is sensitive to moisture is accommodated in the dry door chamber. The connection between the electrical drive and the scissors-type mechanism takes place in a way not described in any more detail by means of a Bowden cable.

This door module has the same disadvantages as the prior art described at the beginning, without however being provided with the advantage of simplified assembly. With the door module having a wide variety of designs, the trough-like depressions provided for receiving the functional elements also have to be shaped for all conceivable equipment variations, whereby the weight of the door module is once again increased.

A door module of the generic type is disclosed in the publication WO 03/031233 A1. In the case of this door module, the separation between the dry region and the wet region is effected by a sheet of plastic, which is arranged between the metal structure of the vehicle door and the interior trim part. The sealing with respect to the metal structure takes place by means of a sealing bead, for example a foamed sealing cord, which may, if appropriate, be provided with a special surface coating in order to counteract penetration of moisture by capillary action. The sheet of plastic is for its part connected to the outwardly directed side of the interior trim part by adhesive bonding and is penetrated in a sealed manner by functional components arranged in the dry door chamber.

This design achieves an advantageous separation of the "supporting components" function and the "sealing or acoustics" function. The comparatively large surface area of the wet door chamber on the interior side is consequently covered over only by the thin-walled, and consequently lightweight, separating sheet.

SUMMARY

The invention is based on the problem of further developing the door module of the generic type in such a way that its assembly and the sealing between the wet and dry door chambers is further simplified.

The problem is solved according to the invention in the case of such a door module by the interior decorative trim and/or a reinforcing element arranged on it having contact pressure zones which preferably extend over the whole periphery of the door module and onto which the separating sheet can be pressed in a sealing manner by contact with the door shell.

With a corresponding design of the separating sheet and contact pressure zone, this procedure can make additional sealing with plastic sealing compounds or peripheral sealing profiles superfluous, or at least simpler.

As in the last-mentioned prior art, the term separating sheet in principle includes all thin-walled, flexible or pliable sheet-like bodies, which may, if appropriate, also have a three-dimensionally shaped structure.

According to a first configuration of the invention, the functional components and/or the connecting means are at least partly arranged directly on the flat side of an interior decorative trim of the door module that is facing the dry chamber. Alternatively or in addition, they may also be arranged on one or more reinforcing elements, which for their part can be connected to the interior decorative trim of the door module. Such reinforcing elements are generally required in any case for stiffening the interior decorative trim, and to this extent do not increase the weight of the door module.

As already known from the prior art cited at the beginning, the door module can preferably be engaged in a latching manner with the door shell in the Y direction while forming the mechanical and/or electrical connection between the functional components and the door components. This design makes it possible for the door module and the door shell to be joined in a particularly efficient and reliable way.

According to a special configuration of the invention, the separating sheet is preassembled on the door module and can be fitted together with the latter on the door shell. In this way, the encapsulation of the entire dry door chamber takes place at the supplier's, while the vehicle manufacturer, after inserting the door components in the door shell, only has to place the door module provided with the separating sheet onto the metal structure of the vehicle door.

A contact pressure zone suitable for carrying out the invention may comprise, for example, rib-like projections extending outward, that is to say in the direction of the separating sheet, from the interior decorative trim and/or the reinforcing element, on the end face of which the separating sheet is pressed after assembly. When there are particularly high requirements for the sealing effect, the contact pressure zone may also have two ribs spaced apart from each other, onto which the separating sheet is pressed while a sealant is introduced into the spacing between the ribs. In this case, the sealants may be arranged, for example, on the far side of the ribs on the separating sheet and be able to be brought into contact with the inner door panel during the assembly of the door module. The sealants preferably comprise a bead of sealant, which, if appropriate, can be applied automatically and, before the assembly of the door module, can be covered with a peel-off protective film. A seal that is already adequate without additional sealants can be achieved with a separating sheet which comprises at least one layer of a closed-cell, and consequently waterproof, plastic foam, in particular of a polyolefin, preferably of polyethylene. Such a sheet may have, for example, a thickness of from 3 to 6 mm with an apparent density of from 30 to 60 kg/m$^3$, which is locally compressed during assembly to approximately 25 to 50% of its original thickness.

In a special design, the separating sheet may also be formed with at least two layers to improve the acoustic properties, the layer facing the dry door chamber consisting of an open-cell plastic foam, in particular of a polyolefin, preferably of polyethylene.

In the case of a particularly preferred door module according to the invention, at least one of the functional elements in the dry door chamber is formed as an electrical drive (motor/gear mechanism) of a window lifter, preferably including an (electronic) control system and an operating device, which is fastened to the decorative trim part and/or a reinforcing element connected to the latter and the driven shaft of which penetrates through the separating sheet in the Y direction in a sealed manner but rotatably. The alignment of the driven shaft, provided for example with external toothing, allows it to be inserted during assembly into a counterpart of the mechanical part of the window lifter that is provided with internal toothing. Conical regions on the driven shaft and/or the counterpart facilitate here the self-finding of the torque-transmitting connection.

The invention also relates to a vehicle door with such a door module in which the inner door panel of the door shell preferably has a large-area cutout extending over a significant part of the inner door panel. Such a cutout on the one hand facilitates the installation of the door components and on the other hand reduces the weight of the vehicle door. In this case, the surface area of the cutout is advantageously at least 50%, preferably approximately 70%, of the region of the inner door panel that is covered by the door module. The installation of the sometimes bulky door components is of course facilitated by the cutout being free from struts running in its cross section.

BRIEF DESCRIPTION OF THE FIGURES

The figures represent various configurations of the invention schematically and by way of example. In the figures.

DETAILED DESCRIPTION

Figure 1:
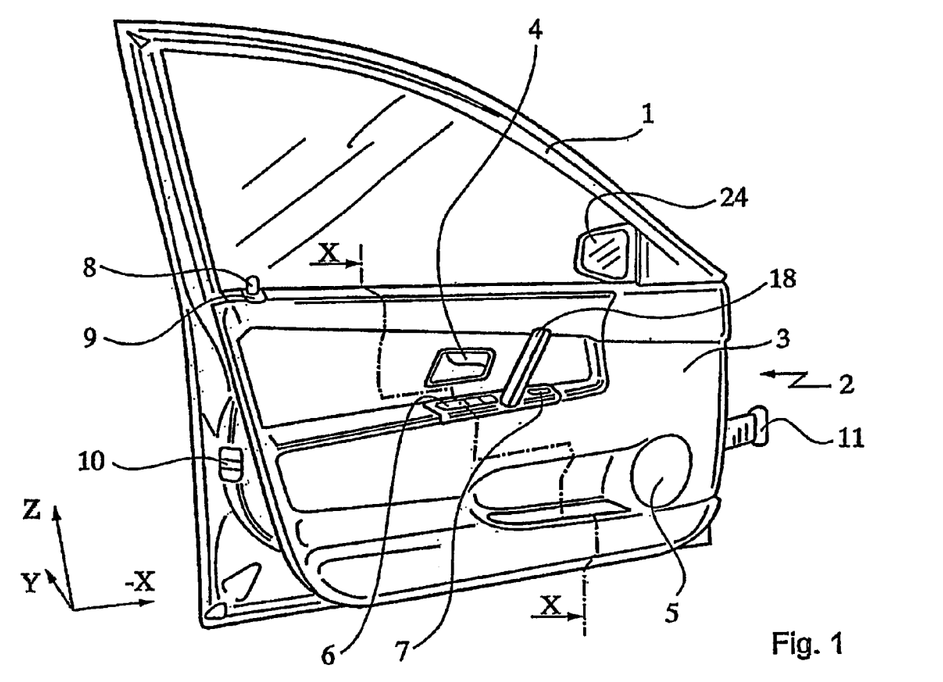
FIG. 1 shows a view from the interior side of a vehicle door equipped according to the invention.

The left-hand vehicle door represented in FIG. 1 comprises a door shell 1, which is usually produced from steel sheet and is provided on its side facing the interior of the vehicle with a door module 2. In the view as shown in FIG. 1 there can be seen of the door module the interior decorative trim 3 on the interior side and a number of functional elements arranged in the door module 2, namely a door opener 4, a loudspeaker 5, a switch plate 6 with switch units 7 and a door locking knob 8 in a knob plate 9.

The door shell 1 for its part has door components, of which the door catch 10, which can be actuated by the door opener 4, can be seen in FIG. 1. A cable line 11, which can be connected to the body of the vehicle, serves for the transmission of energy and information from the vehicle into the vehicle door.

FIG. 1 also shows the customary system of X, Y, Z coordinates of a motor vehicle. The references to a Y orientation in the assembly apply analogously to the right-hand door in the (−Y) direction.

Figure 2:
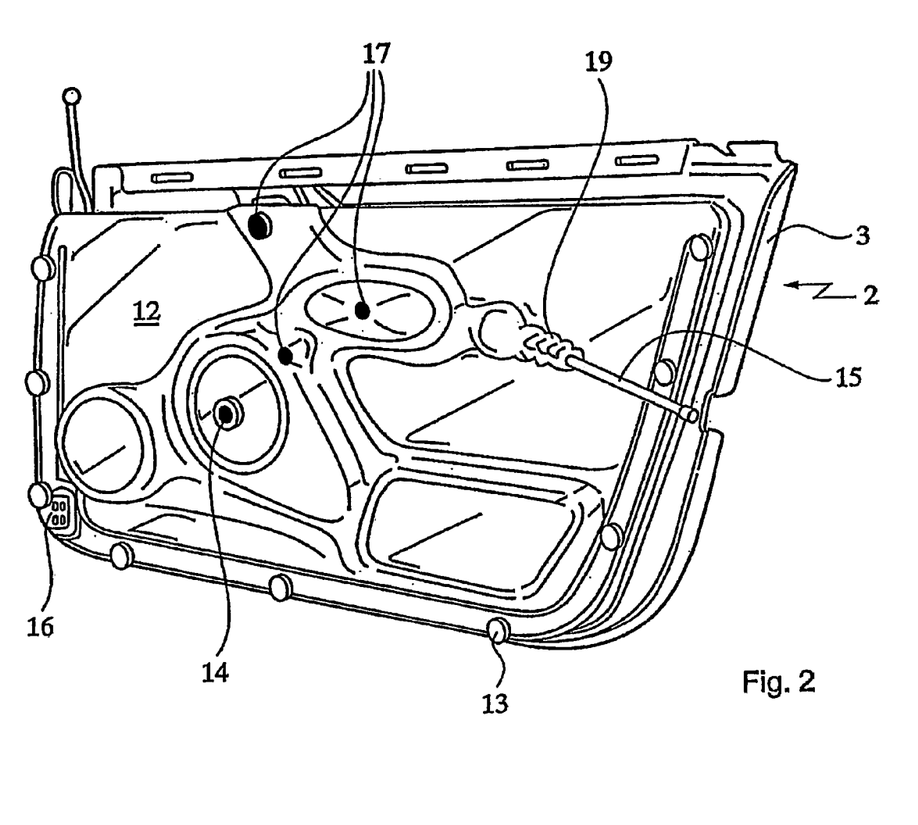
FIG. 2 shows the view from the wet chamber side of the door module prepared for assembly on the door shell.

As can be seen from FIG. 2, the trough-like door module 2 is closed on its outwardly facing side by means of a separating sheet 12. The separating sheet 12 is penetrated on the one hand by latching hooks 13, which are arranged in a U-shaped manner peripherally around the interior decorative trim part 3 and face the door shell 1, and on the other hand by connecting means for the mechanical and electrical connection of the functional elements that are located in the door module 2 to the door components that are arranged in the shell part. The connecting means include the driven shaft 14 for the electrical actuation of a window lifter, the Bowden cable 15, which connects the door opener 4 to the door catch 10, and also a plug-in connection 16 for the data and energy transmission between the cable line 11 and the door module 2.

The separating sheet 12 also has apertures in the region of screwed joints 17, which serve for the mechanical connection of a handle 18 on the interior side (FIG. 1) and the door opener 4 to the door shell 1 or door components arranged therein.

Although both the Bowden cable 15 and the driven shaft 14 must move in relation to the separating sheet 12, the related apertures, like the apertures of the screwed joints 17 and latching hooks 13, must be of a waterproof design, as still to be described below. Serving in this case for sealing the Bowden cable 15 is a bellows 19 formed onto the separating sheet 12.

In the production stage shown in FIG. 2, the door module 2 is passed on by the supplier to the vehicle manufacturer and prepared by the latter on the final assembly line of the vehicle.

Figure 3:
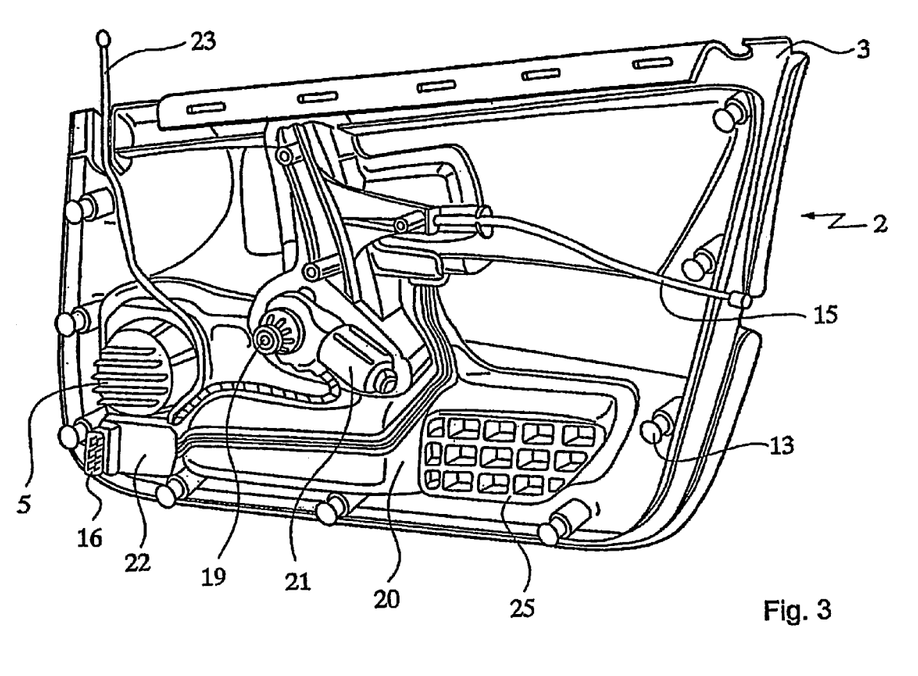
FIG. 3 shows the door module according to claim 2 after removal of the separating sheet.

As represented in FIG. 3, the dry door chamber formed between the separating sheet 12 and the interior decorative trim 3 receives the reinforcing element 20, which is connected to the interior decorative trim 3; and also functional elements which are anchored directly on the interior decorative trim 3 or on the reinforcing element 20, of which the electrical drive 21 (motor/gear-mechanism unit) for the window lifter and the door control unit 22 become visible only when the separating sheet is removed. From the latter there extends a further cable line 23 to the electrically adjustable and/or heatable exterior mirror 24 (see FIG. 1) of the vehicle door.

Figure 4:
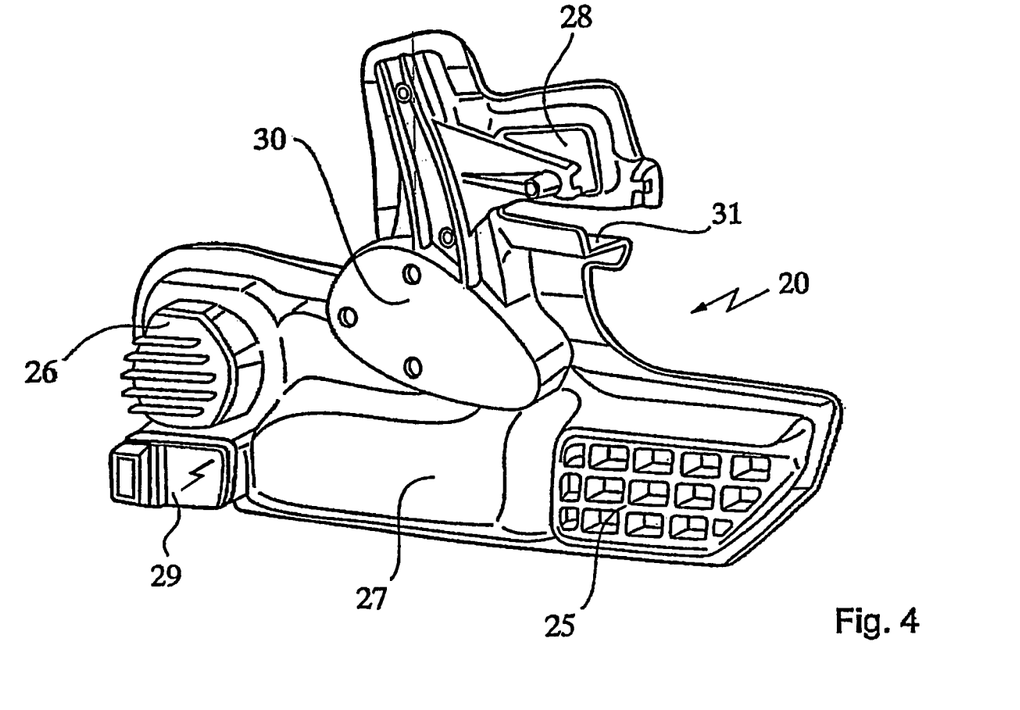
FIG. 4 shows the view of an isolated reinforcing element.

The reinforcing element 20 is provided with a rib structure 25, which can be seen in FIGS. 3 and 4, is assembled in the manner of a block and serves for improving accident protection in the event of side impact. The reinforcing element 20, preferably configured as an injection-molded part of glass-fiber reinforced polypropylene (PP-GF), can be formed in a geometrically very complex manner. It is therefore envisaged to form integrally on the reinforcing element 20 not only the rib structure 25 but also the cup-like receptacle 26 for the loudspeaker 5, the inner door shell 27, a door opener frame 28, the housing 29 for the plug-in connection 16 and the door control unit 22 as well as assembly bridges 30, 31 for the electrical drive 21 and the switch plate 6.

Figure 5:
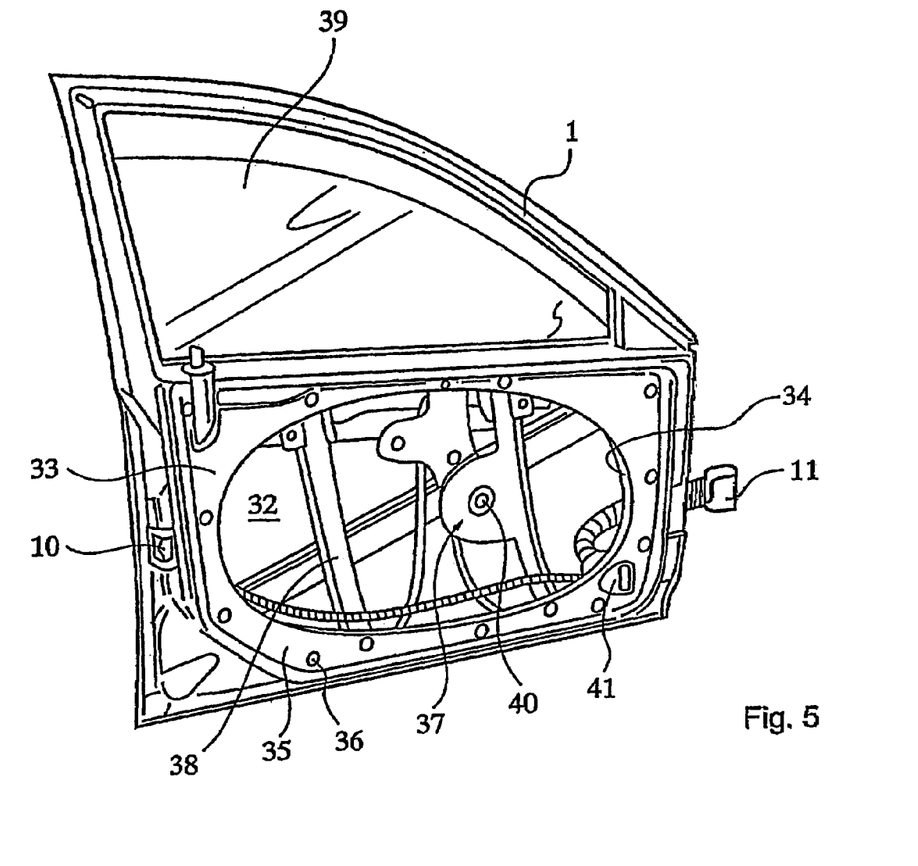
FIG. 5 shows a view of the inner door panel of the vehicle door with the door module removed.

The metal structure of the vehicle door shown in FIG. 5 comprises the door shell 1 with an outer door panel 32 and an inner door panel 33, which is provided with a generous cutout 34. The inner door panel 33, surrounding the cutout 34, forms a sealing flange 35 with clip openings 36, into which the latching hooks 13 of the door module 2 can be inserted in the Y direction. Following this assembly, the separating sheet 12 lies in a sealing manner against the sealing flange 35, preferably in direct contact, that is without interposed sealing profiles.

Arranged between the inner door panel 33 and the outer door panel 32 are door components, for example the mechanism 37 of the window lifter and the guiding rails 38 for the vertically displaceable side window 39, which can be assembled without any problem in the wet door chamber 44 through the generously dimensioned cutout 34. The mechanism 37 has with respect to the driven shaft 14 of the electrical drive 21, arranged on the trim side, a counterpart 40, into which the drive shaft 14 can be pushed in the Y direction, preferably in a self-finding manner, during the assembly of the door module. Congruent toothing of the driven shaft 14 and counterpart 40, running axially parallel, permits the transmission of the torque without opposing pushing-in. Furthermore, the plug-in connection 16 is in this case fitted into a further counterpart 41. The Bowden cable 15 must previously be manually coupled to the door catch 10.

Figure 6:
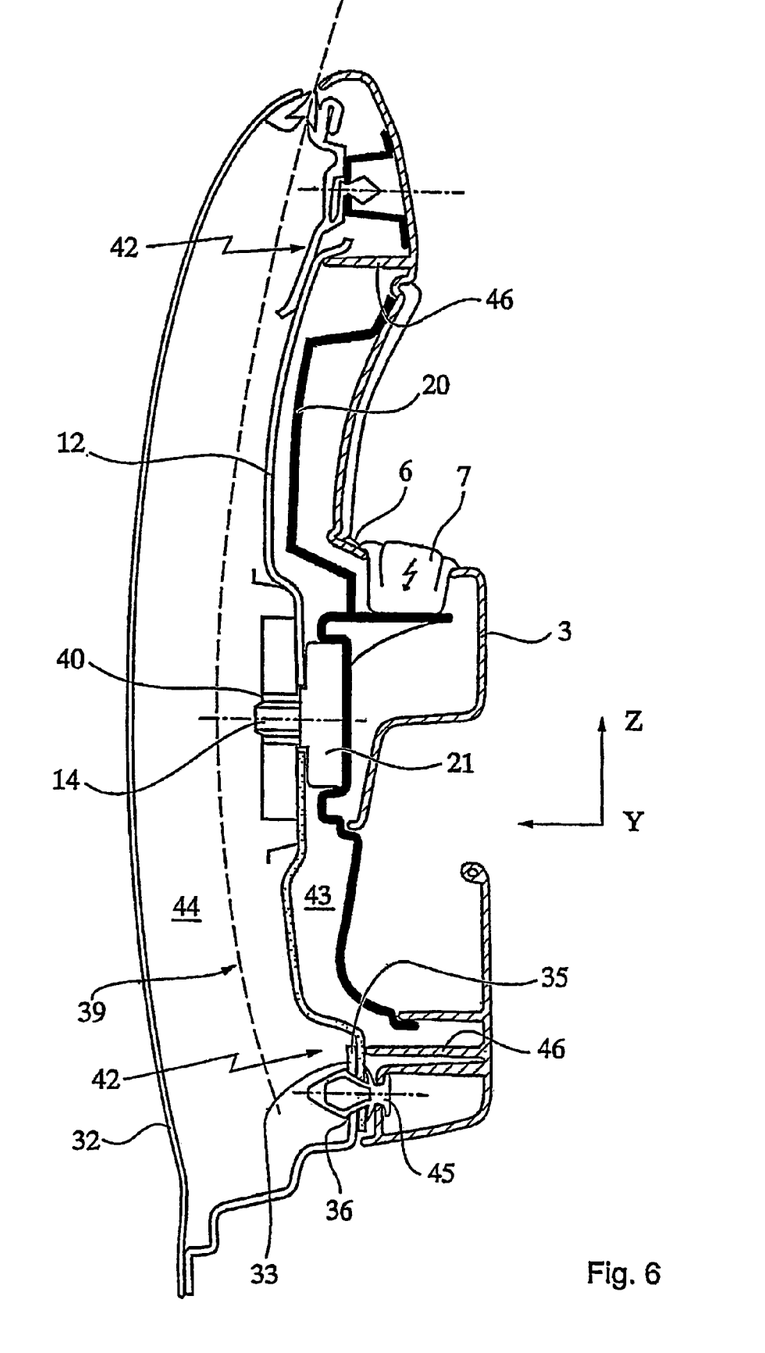
FIG. 6 shows the section X—X through the vehicle door as shown in FIG. 1.

In the longitudinal section shown in FIG. 6, the construction of the assembled vehicle door can be seen in detail. Special attention should be paid to the transitions 42, formed as contact pressure zones, between the interior decorative trim 3, the separating sheet 12 and the inner door panel 33, which are decisive for the sealing between the dry door chamber 43 and the wet door chamber 44.

Horizontally outwardly extending latching hooks 13 in the form of clips 45 arranged peripherally on the interior decorative trim 3 have the effect after their insertion in the clip openings 36 on the door side of creating a pressing force acting in the Y direction between the interior decorative trim 3 and the inner door panel 33, which is transmitted via the interposed, closed-cell foamed separating sheet 12. A rib-like projection 46 formed onto the interior decorative trim and extending outward (Y direction) in a peripheral manner in the region of the sealing flange 35 of the inner door panel, has the effect that the pressing force is introduced linearly into the separating sheet 12, a high exerted pressure being created locally, with a correspondingly great sealing effect. The clips 45 are arranged outside the rib-like projection 46, and consequently also outside the dry door chamber 43.

Figure 7:
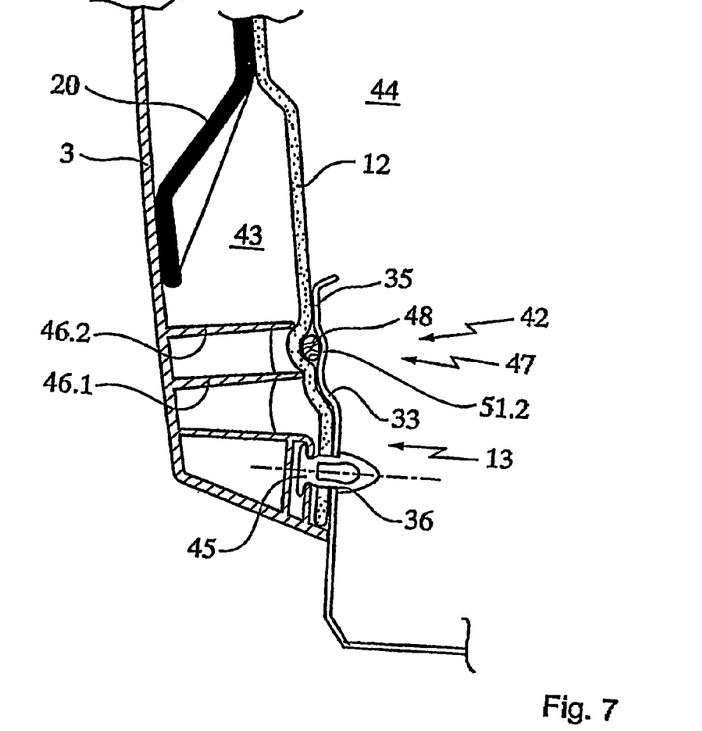
FIG. 7 shows an enlarged view of a first connection between the inner door panel and a door module according to the invention.

FIG. 7 shows a further design of the transition 42, in which two radially spaced apart rib-like projections 46.1, 46.2 are arranged peripherally on the interior decorative trim 3. The sealant 47 in the form of a plastically deformable bead of sealant 48, which before assembly can be covered with a peel-off protective film, is applied to the side of the separating sheet 12 facing the sealing flange 35 in the spacing between the rib-like projections 46.1, 46.2. After the removal of the protective film and assembly of the door module 2, the bead of sealant 48 can be brought into contact with the inner door panel 33.

Figure 8:
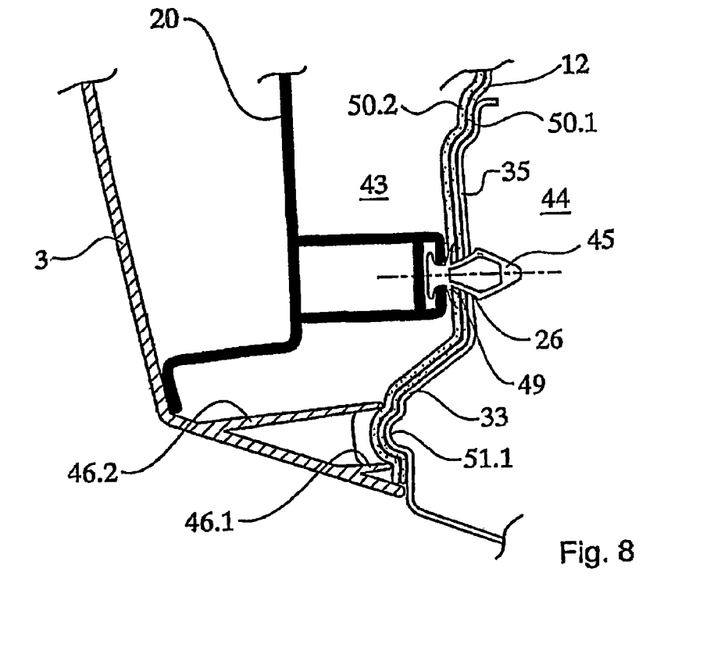
FIG. 8 shows an alternatively configured connection.

Represented in FIG. 8 is an alternative configuration of the transition 42, in which the clips 45 are arranged on the near side of the rib-shaped projections 46.1, 46.2, that is to say within the dry door chamber 43, and therefore have to be separately sealed. For this purpose, the clips 45 are provided in the head region with a peripheral, convexly curved sealing collar 49, which presses the separating sheet 12 onto the sealing flange 35 along a circular line. In this exemplary embodiment, the separating sheet 12 is of a two-layered construction, the layer 50.1 facing the wet door chamber 44 being of a closed-cell form, and consequently waterproof, whereas the layer 50.2 facing the dry door chamber is of an open-cell form, and consequently acoustically active. On the head side, the clips 45 are let into a reinforcing element 20, which for its part is welded to the interior decorative trim 3. The sealing flange 35 of the inner door panel 33 is provided in the spacing between the rib-like projections 46.1, 46.2 with a protuberance 51.1, which is directed inward, that is to say in the direction of the interior decorative trim, and by which the sealing is improved while dispensing with sealant 47. By contrast, if a bead of sealant 48 is inserted (FIG. 7), the inner door panel can be provided with a protuberance 51.2 facing the wet door chamber, in order to create the space for the bead of sealant 48 between the separating sheet 12 and the sealing flange 35.

Figure 9:
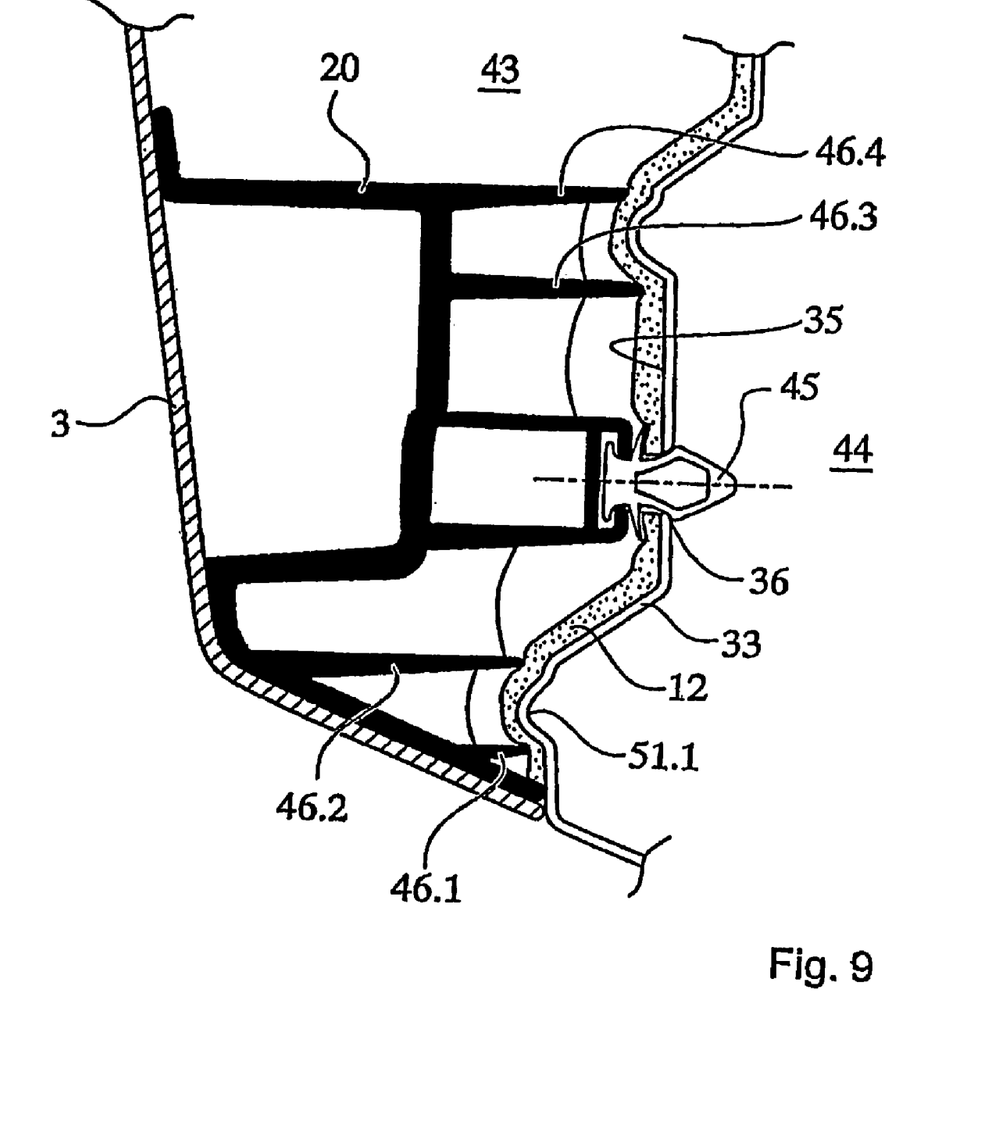
FIG. 9 shows a third connection situation designed according to the invention.

The exemplary embodiment as shown in FIG. 9 departs from the designs previously described to the extent that both the rib-like projections 46 (in this case two pairs 46.1/46.2 and 46.3/46.4, which enclose the clip 45) and the receptacle for the clip 45 are arranged on the reinforcing element 20.

In the last figures, the connection between the electrical drive 21 and the mechanism 37 of the window lifter is represented before (FIG. 10) and after (FIG. 11) the assembly of the door module 2.

Figure 10:
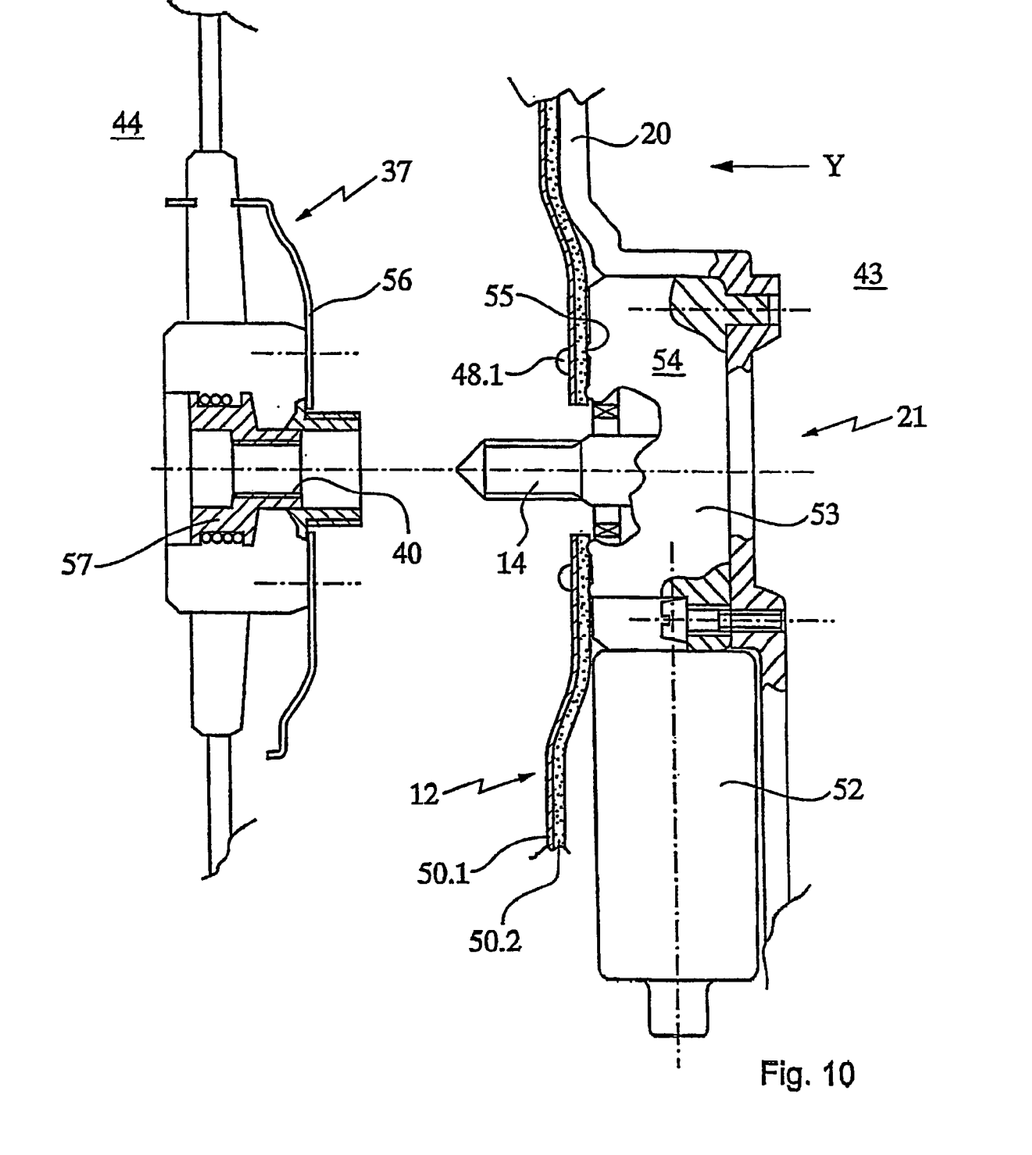
FIG. 10 shows a possible design of connecting means for connecting the electrical drive and mechanics of a window lifter before assembly.
Figure 11:
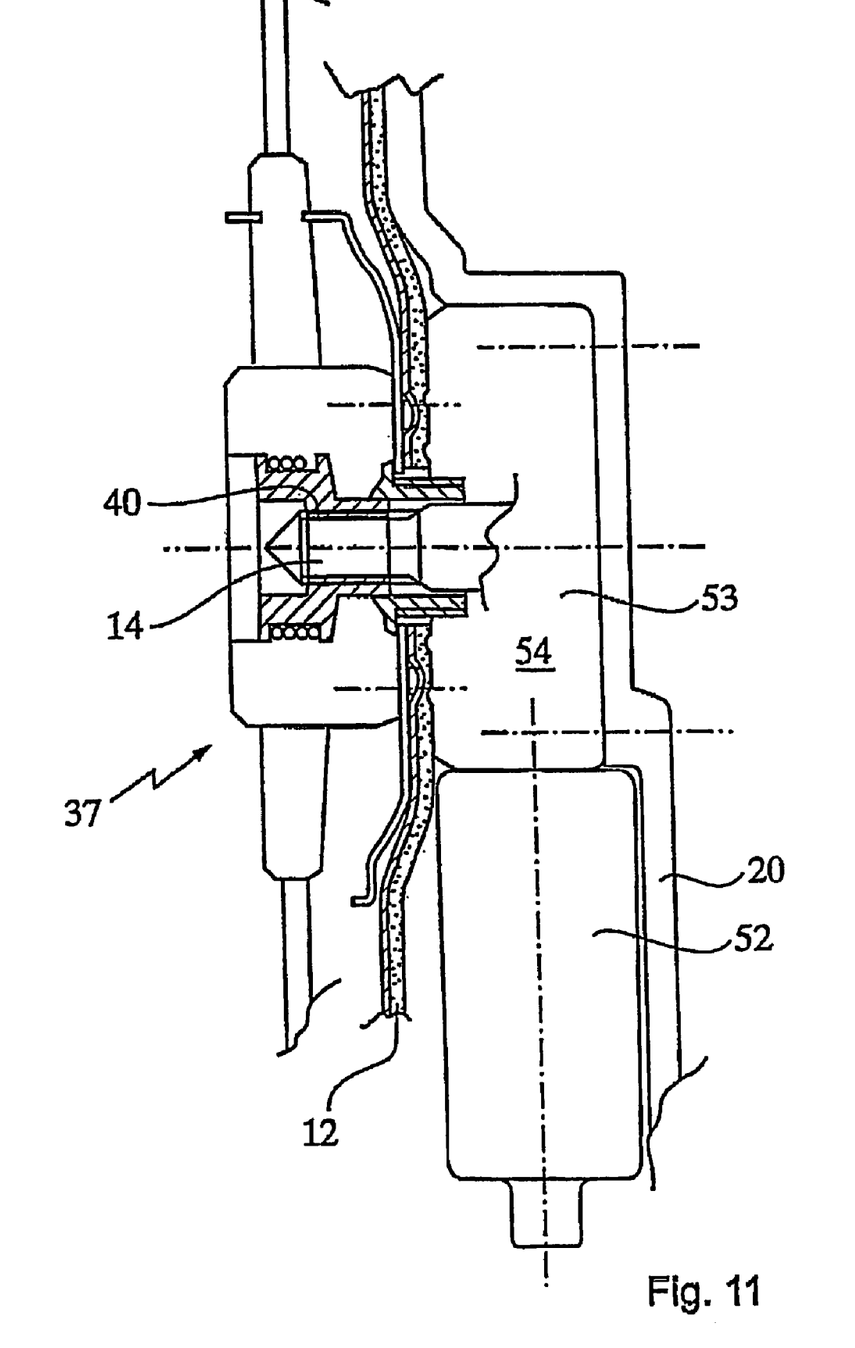
FIG. 11 shows the connecting means as shown in FIG. 10 in the joined state.

The electrical drive 21 comprises an electric motor 52 with a rotor mounted orthogonally in relation to the Y direction and an angular gear mechanism 53 with an driven shaft 14, which runs in the Y direction, is conically tapered at the end and has external toothing, which is mounted in a sealed manner in the angular gear mechanism 53. The housing 54 of the angular gear mechanism 53 is provided on its side facing the wet door chamber 44 with annularly peripheral projections 55, by which the separating sheet 12 lying in between (if appropriate with insertion of a further bead of sealant 48.1) can be pressed against the metal structure of the mechanism 37. The mechanism 37 for its part comprises the counterpart 40 with internal toothing, which is non-rotatably connected to the cable reel 57 of the window lifter.

During the assembly of the door module, the driven shaft 14, protruding beyond all the other components (for example the clips 45) takes on special significance, since it represents the primary, relatively easy-to-find, positioning point for the alignment of the door module. Only once the driven shaft 14 has been pushed a little further into the counterpart 40 is a centering of the clips 45 and of the clip openings 36 as well as of the other connecting elements (for example plug-in connection 16) brought about by turning of the door module 2.

If, on the other hand, a different positioning point is provided for the assembly, it is recommendable to mount the driven shaft 14 or the counterpart 40 such that it is floating in the X and Z directions, in order to avoid distortion.

LIST OF DESIGNATIONS 1 door shell
2 door module
3 interior decorative trim
4 door opener
5 loudspeaker
6 switch plate
7 switch unit
8 door locking knob
9 knob plate
10 door catch
11 cable line
12 separating sheet
13 latching hook
14 driven shaft
15 Bowden cable
16 plug-in connection
17 screwed joint
18 handle
19 bellows
20 reinforcing element
21 electrical drive
22 door control unit
23 cable line
24 exterior mirror
25 rib structure
26 receptacle
27 inner door shell
28 door opener frame
29 housing
30, 31 assembly bridge
32 outer door panel
33 inner door panel
34 cutout
35 sealing flange
36 clip openings
37 mechanism (of the window lifter)
38 guiding rails
39 side window
40, 41 counterpart
42 transition
43 dry door chamber
44 wet door chamber
45 clip
46 rib-like projection
47 sealant
48 bead of sealant
49 sealing collar
50 layer
51 protuberance
52 electric motor
53 angular gear mechanism
54 housing
55 projection
56 metal structure
57 cable reel

The invention claimed is:

1. A door module for a vehicle door having a sealing flange, the door module comprising:
    an interior trim having at least one projection;
    a separating sheet dividing the vehicle door into a dry chamber and a wet chamber;
    one or more clips configured to bias the interior trim toward the sealing flange so that the at least one projection presses the separating sheet against the sealing flange.

2. The door module of claim 1, wherein the interior trim comprises a reinforcing element and the projection extends from either the interior trim or the reinforcing element.

3. The door module of claim 1, wherein the at least one projection comprises a pair of ribs.

4. The door module of claim 3, further comprising a sealant introduced between the ribs and arranged on the separating sheet.

5. The door module of claim 4, wherein the sealant comprises a bead of sealant covered with a peel-off protective film before the assembly of the module.

6. The door module of claim 1, wherein the separating sheet comprises at least one layer of a closed-cell foam.

7. The door module claim 1, wherein the separating sheet comprises a first layer comprising of an open-cell plastic foam and a second layer of a closed-cell foam.

8. The door module claim 1, further comprising at least one vehicle component at least partially disposed in the dry chamber and extending through the separating sheet.

9. A door module for a vehicle door that is divided in a sealed manner into an outer wet door chamber facing a door shell, and an inner dry door chamber facing an interior trim and including mechanical or electrical functional components that are coupled in a preassembled manner on the door module in the dry door chamber, a seal between the dry door chamber and the wet door chamber being formed by a separating sheet that is penetrated by a clip, wherein the separating sheet is pressed in a sealing manner by at least one projection extending from the interior trim on to the door shell and the clip coupling the interior trim to the door shell.

10. The door module of claim 9, wherein the functional components are at least partly arranged directly on a flat side of the interior trim of the door module that is facing the dry chamber.

11. The door module of claim 10, wherein the functional components are at least partly arranged on a reinforcing element that is coupled to the interior trim of the door module.

12. The door module of claim 9, wherein the door module is engaged in a latching manner with the door shell in a direction perpendicular to the door shell while forming the mechanical or electrical coupling between the functional components and the door components.

13. The door module claim 9, wherein the separating sheet is preassembled on the door module which is then coupled to the door shell.

\* \* \* \* \*